(12) United States Patent
Kim (10) Patent No.: US 8,566,851 B2
(45) Date of Patent: Oct. 22, 2013

(54) SLIM TYPE OPTICAL DISC DRIVE USING A FLEXIBLE FLAT CABLE

(75) Inventor: Sunmin Kim, Seoul (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 0 days.

(21) Appl. No.: 13/572,381

(22) Filed: Aug. 10, 2012

(65) Prior Publication Data

US 2013/0047171 A1 Feb. 21, 2013

(30) Foreign Application Priority Data

Aug. 17, 2011 (KR) .................... 10-2011-0081447

(51) Int. Cl.
*G11B 33/12* (2006.01)
(52) U.S. Cl.
USPC .......................................................... 720/653
(58) Field of Classification Search
USPC .......................................................... 720/653
See application file for complete search history.

(56) References Cited

U.S. PATENT DOCUMENTS

| | | | | |
|---|---|---|---|---|
| 6,151,284 | A * | 11/2000 | Watanabe et al. | 720/601 |
| 6,320,835 | B1 * | 11/2001 | Kamei | 720/653 |
| 7,234,149 | B2 * | 6/2007 | Takahashi et al. | 720/601 |
| 7,587,727 | B2 * | 9/2009 | Iizuka et al. | 720/652 |
| 7,698,714 | B2 * | 4/2010 | Choi | 720/601 |
| 7,774,804 | B2 * | 8/2010 | Onuma et al. | 720/653 |
| 8,076,594 | B2 * | 12/2011 | Ou et al. | 174/480 |
| 8,341,656 | B2 * | 12/2012 | Lin et al. | 720/652 |
| 2005/0229196 | A1 * | 10/2005 | Iizuka et al. | 720/658 |
| 2012/0072928 | A1 * | 3/2012 | Ou et al. | 720/613 |

* cited by examiner

*Primary Examiner* — Mark Blouin
(74) *Attorney, Agent, or Firm* — Birch, Stewart, Kolasch & Birch, LLP

(57) ABSTRACT

An optical disc drive according to one embodiment of the present invention comprises a case; a tray for loading an optical disc; and a flexible flat cable for connecting a first connector installed at the rear of the case and a second connector of a printed circuit board installed at the rear surface of the tray, where insulating tape for impedance matching may be attached to the flexible flat cable. The insulating tape may be attached to a bottom surface of a fixed part of the flexible flat cable. Also, tape with meshed lines of conductive material may be attached to a surface of the moving part of the flexible flat cable come into contact with the printed circuit board while the tray stays in the case. Therefore, the present invention allows low cost flexible flat cables to be used for SATA interface without generating errors due to impedance mismatch.

7 Claims, 9 Drawing Sheets

(Bottom View)

Bottom surface come into contact with chassis 12

Tray Open

Tray Close

Fig. 3

Tray Open

Tray Close

Old FFC

Eye Pattern

Not Clear

New FFC

Insulation Tape (301)

Eye Pattern

Clear

SLIM TYPE OPTICAL DISC DRIVE USING A FLEXIBLE FLAT CABLE

BACKGROUND

1. Field

The present invention relates to an optical disc drive. More specifically, the present invention relates to a slim type optical disc drive making use of low cost flexible flat cable (FFC) which can be mass-produced according to the corresponding standard specifications.

2. Discussion of the Related Art

Optical disc drives (ODDs) are in wide use today, which record data such as audio, video, and text to or play the data from various types of optical discs such as CDs, DVDs, and BDs.

Figure 1:
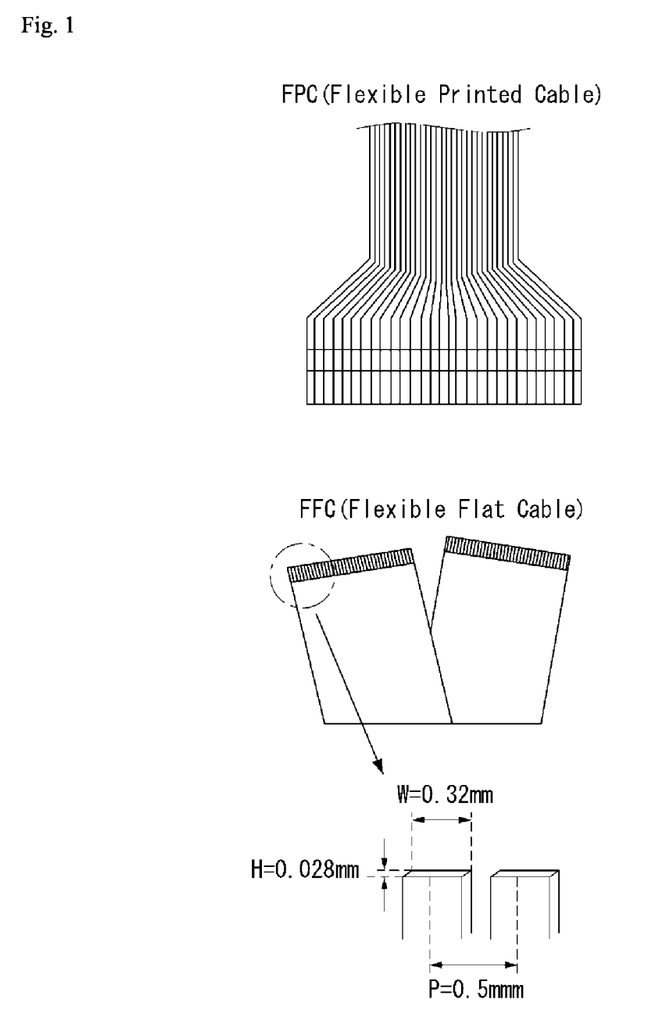
FIG. 1 illustrates a conventional flexible printed cable and a flexible flat cable.

Notebook computers are usually equipped with a slim-type optical disc drive; as shown in FIG. 1, the slim-type optical disc drive may employ a flexible printed cable (FPC) or a flexible flat cable (FFC) to be connect to a SATA connector which is connected mechanically to a notebook computer and a moving tray.

The flexible printed cable (FPC) has an advantage of allowing conductor specifications such as length, width, and so on to be chosen arbitrarily during cable design for adjusting impedance of the cable but incurs high manufacturing costs; meanwhile, the flexible flat cable (FFC) can be mass-produced according to the corresponding standard specifications, thus allowing low manufacturing costs but provides only a few design choices for conductor specifications such as length, width, and so on to adjust impedance of the cable.

Figure 2:
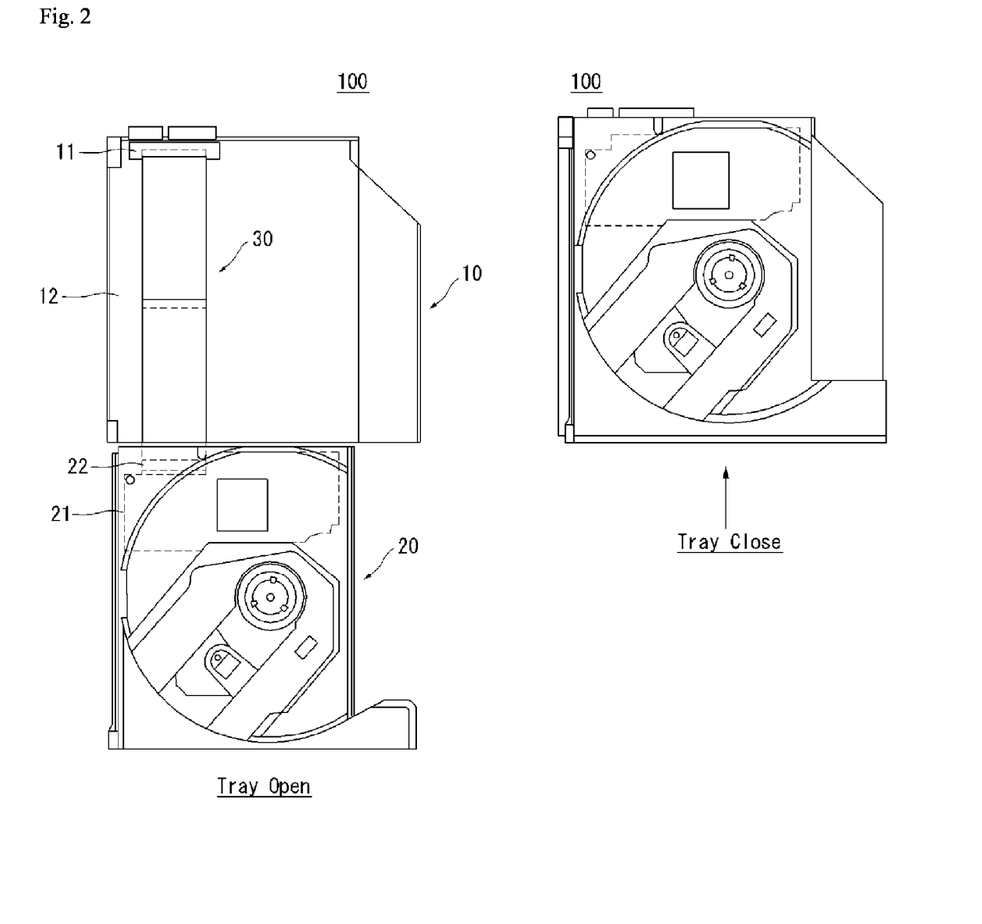
FIG. 2 illustrates a slim-type optical disc drive for which a flexible printed cable is used.

For example, as shown in FIG. 1, the conductor of flexible flat cable (FFC) in wide use has been standardized such that W (width)=0.32 mm, H (height)=0.028 mm, P (pitch)=0.5 mm, and so on; therefore, as shown in FIG. 2, in case of using a flexible flat cable (FFC) 30 between the SATA connector 11 installed at the inner, rear surface of the lower case 10 of a slim-type optical disc drive 100 and the PCB connector 22 installed at the printed circuit board (PCB) 21 of the rear surface of the tray 20, impedance matching required for SATA interface designed for fast data transfer is difficult to accomplish.

In other words, in case of using a flexible flat cable 30 manufactured with the specifications that W (width)=0.32 mm, H (height)=0.028 mm, and P (pitch)=0.5 mm, the cable has an impedance value ranging 135 to 140 ohm; meanwhile, since SATA interface requires an impedance value ranging 85 to 115 ohm, if the flexible flat cable 30 is used to connect the SATA connector 11 and the PCB connector 22, an error may occur during fast data transfer employing the SATA interface due to impedance mismatching.

SUMMARY

The present invention has been made in an effort to provide a flexible flat cable which can be used for slim-type optical disc drives.

Specifically, the present invention has been made in an effort to provide a flexible flat cable satisfying an impedance value specified for the SATA interface.

An optical disc drive according to one embodiment of the present invention comprises a case forming an external shape of the optical disc drive; a tray for loading an optical disc by staying in the case or protruding from the front surface of the case; and a flexible flat cable for connecting a first connector installed at rear of the case and a second connector of a printed circuit board installed at a rear surface of the tray, where insulating tape for impedance matching is attached to the flexible flat cable.

In one embodiment, the first connector may be an SATA connector.

In one embodiment, the insulating tape may be attached to the bottom surface of the fixed part of the flexible flat cable.

In one embodiment, second insulating tape may be additionally attached to a surface of the fixed part of the flexible flat cable overlapping a moving part of the flexible flat cable.

In one embodiment, the insulating tape may be attached to at least one of the surfaces of the moving part and the fixed part of the flexible flat cable overlapping each other.

In one embodiment, third tape may be attached to the surface of the moving part of the flexible flat cable come into contact with the printed circuit board while the tray stays in the case, where meshed lines of conductive material may be formed in the third tape.

According to the present invention, flexible flat cables can be employed for SATA interface without incurring impedance mismatching.

Also, according to the present invention, low cost flexible flat cables can be employed for slim-type optical disc drives.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE INVENTION

In what follows, preferred embodiments of an optical disc drive making use of a flexible flat cable according to the present invention will be described in detail with reference to appended drawings.

An optical disc drive according to the present invention can be applied to various types of optical disc players or optical disc recorders as well as notebook computers.

As described with reference to FIG. 2, a slim-type optical disc drive 100 according to the present invention comprises a lower case 10, a tray 20, and so on; the lower case 10 is intended to form an external shape of an optical disc drive 100 and protect constituting elements thereof. The tray 20 stays inside the lower case 10 to carry out operation of recording or playing data of an optical disc; or loading or unloading an optical disc by protruding from the front surface of the lower case 10, where the tray 20 comprises a spindle motor for rotating an optical disc; an optical pickup for reading from or recording to an optical disc; and a transfer means including a sled motor, a shaft, and so on for moving the optical pickup from the innermost to the outermost position. Also, in the rear surface of the lower case 10, installed is an SATA connector 11 while in the rear surface of the tray 20, installed are a printed circuit board 21 where installed are ICs for processing signals coming from the optical pickup or for driving the spindle motor, optical pickup, sled motor, and so on and a PCB connector 22.

Figure 3:
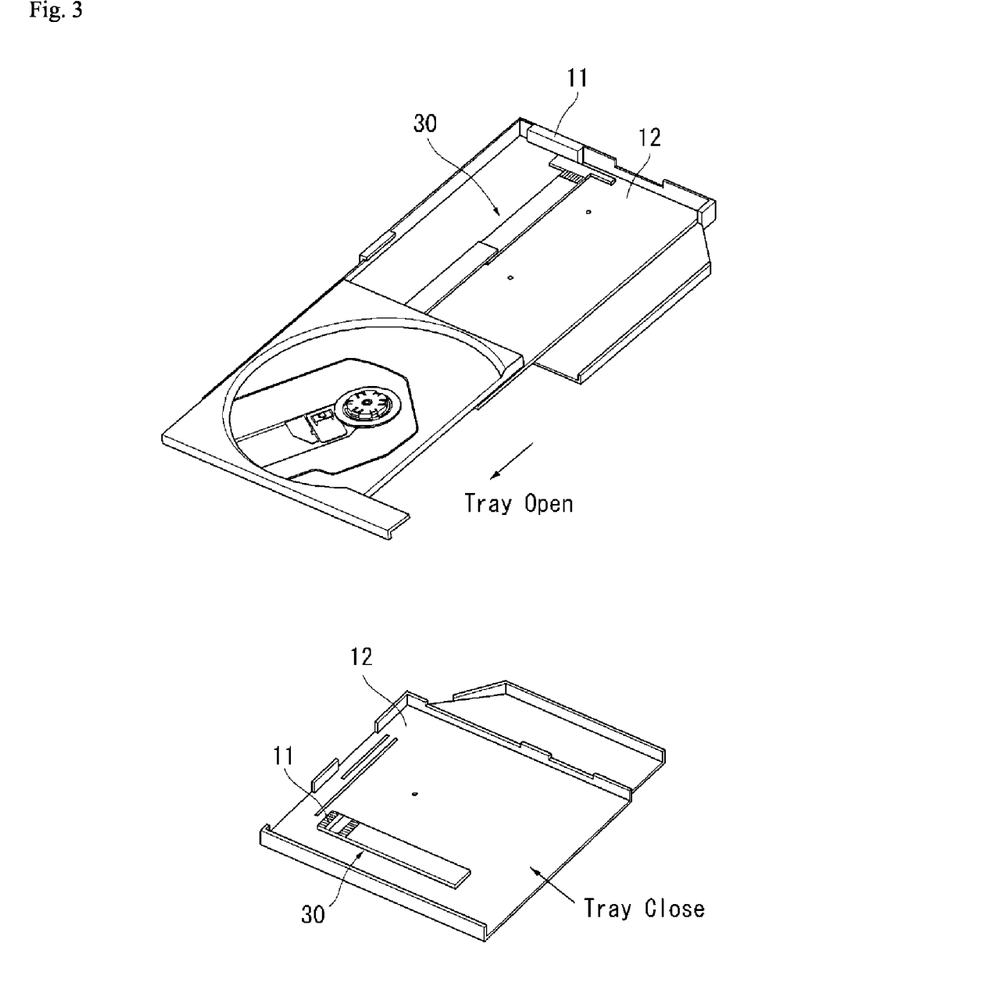
FIG. 3 illustrates the status of a flexible flat cable when a tray of slim-type optical disc drive is opened or closed.

Meanwhile, the SATA connector 11 and the PCB connector 21 are connected to each other by a flexible flat cable 30; as shown in FIG. 3, when the tray 10 is opened, the flexible flat cable 30 is completely unfolded whereas the flexible flat cable 30 is folded when the tray 10 is closed. In other words, the flexible flat cable may be divided into a moving part (no part number provided) which is unfolded only when a tray is opened and a fixed part (no part number provided) which is always unfolded irrespective of open or close state of the tray.

Since the bottom surface of the fixed part is adjacent to the chassis 12 of the lower case, impedance value may abnormally fall off when the bottom surface comes into contact with the chassis 12 at the time of open or close operation of the tray.

Figure 4:
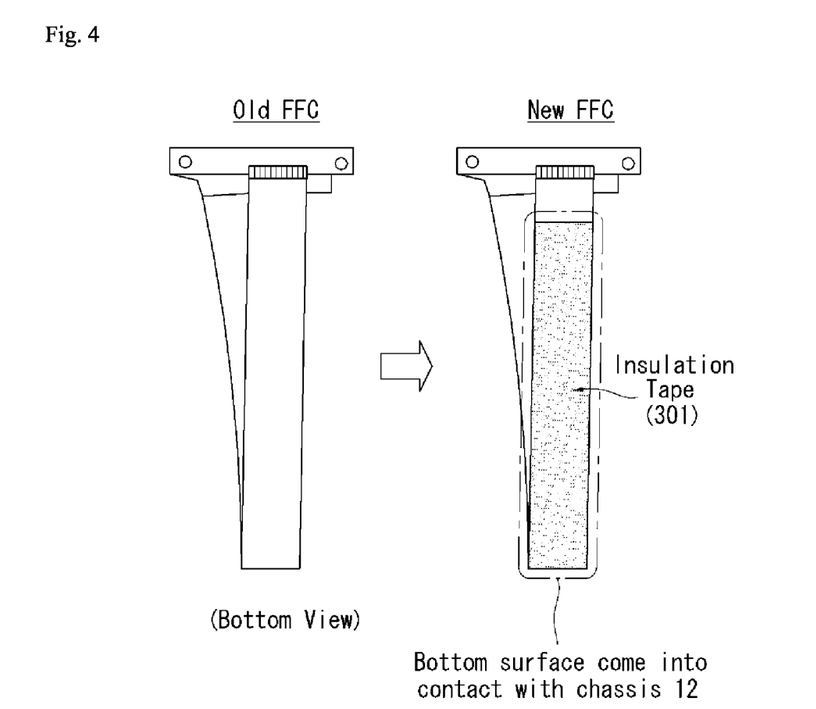
FIG. 4 illustrates a case where insulating tape is attached to the bottom surface of a fixed part of a flexible flat cable according to one embodiment of the present invention.

As shown in FIG. 4, one embodiment of the present invention attaches insulating tape 301 to the bottom surface of the fixed part of the flexible flat cable 30, thereby maintaining a predetermined impedance value even if the chassis 12 of the lower case comes into contact with the bottom surface of the fixed part.

Figure 5:
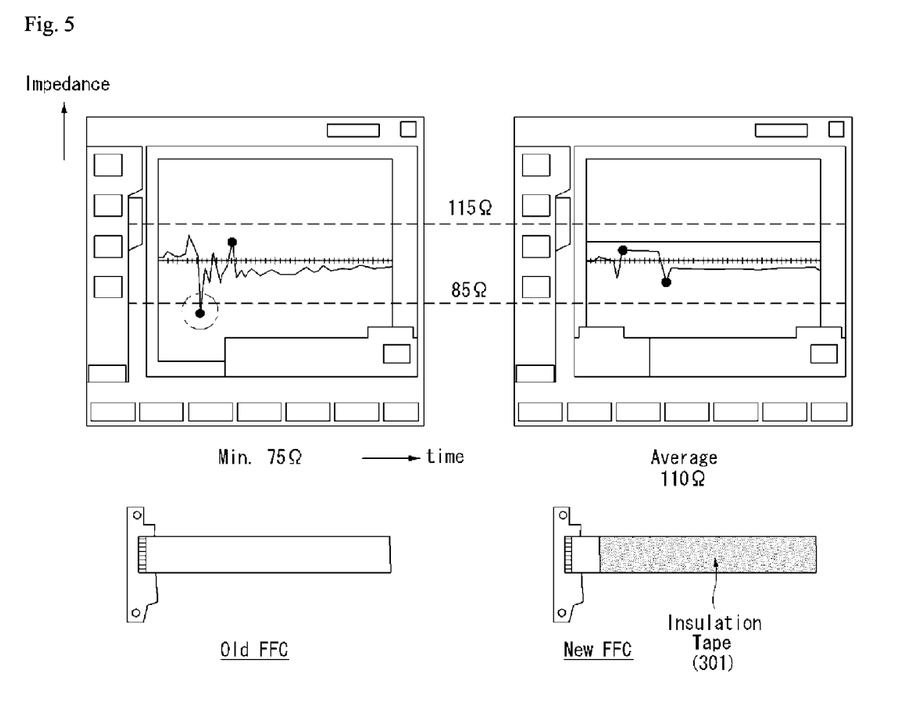
FIG. 5 illustrates impedance measurements when insulating tape is attached to the bottom surface of a fixed part of a flexible flat cable according to one embodiment of the present invention.

For example, as shown in FIG. 5, since insulating tape 301 is not attached to the bottom surface of a fixed part of a conventional FFC, the impedance value falls off to at least 75 ohm when the bottom surface makes contact with the chassis 12 of the lower case; on the contrary, since insulating tape 301 is attached to the bottom surface of the fixed part of a new FFC of the present invention, the impedance value is kept to the average of 110 ohm even if the bottom surface makes contact with the chassis 12 of the lower case.

Meanwhile, the present invention allows insulating tape to be attached to either of the surfaces where the moving part and the fixed part of a flexible flat cable 30 overlap each other when a tray is closed.

Figure 6:
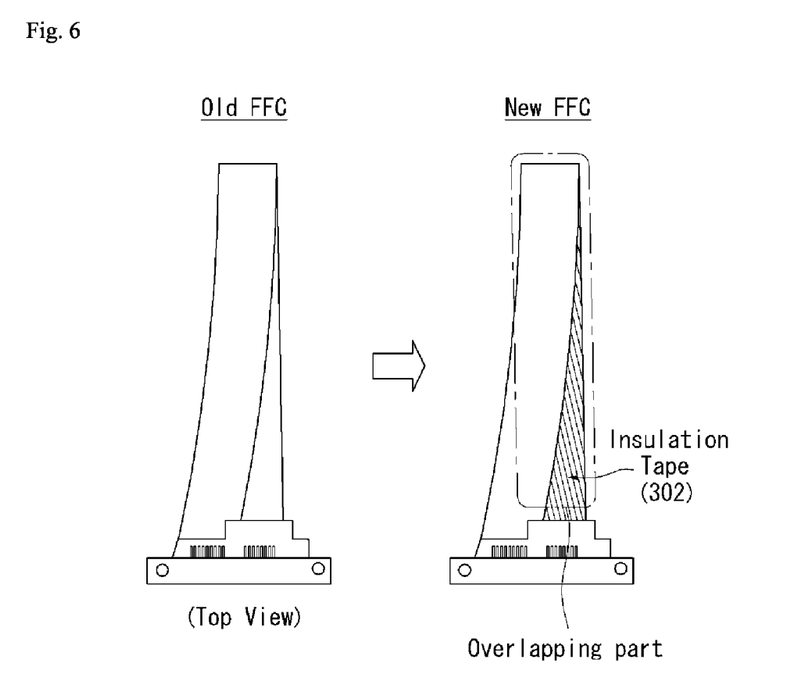
FIG. 6 illustrates a case where insulating tape is attached to the upper surface of a fixed part of a flexible flat cable according to one embodiment of the present invention.

For example, as shown in FIG. 6, by attaching insulating tape 302 additionally to the upper surface which is opposite to the bottom surface of the fixed part of the flexible flat cable 30, inter-symbol interference can be avoided even if the moving part and the fixed part of the flexible flat cable 30 overlap each other as the tray is closed.

Figure 7:
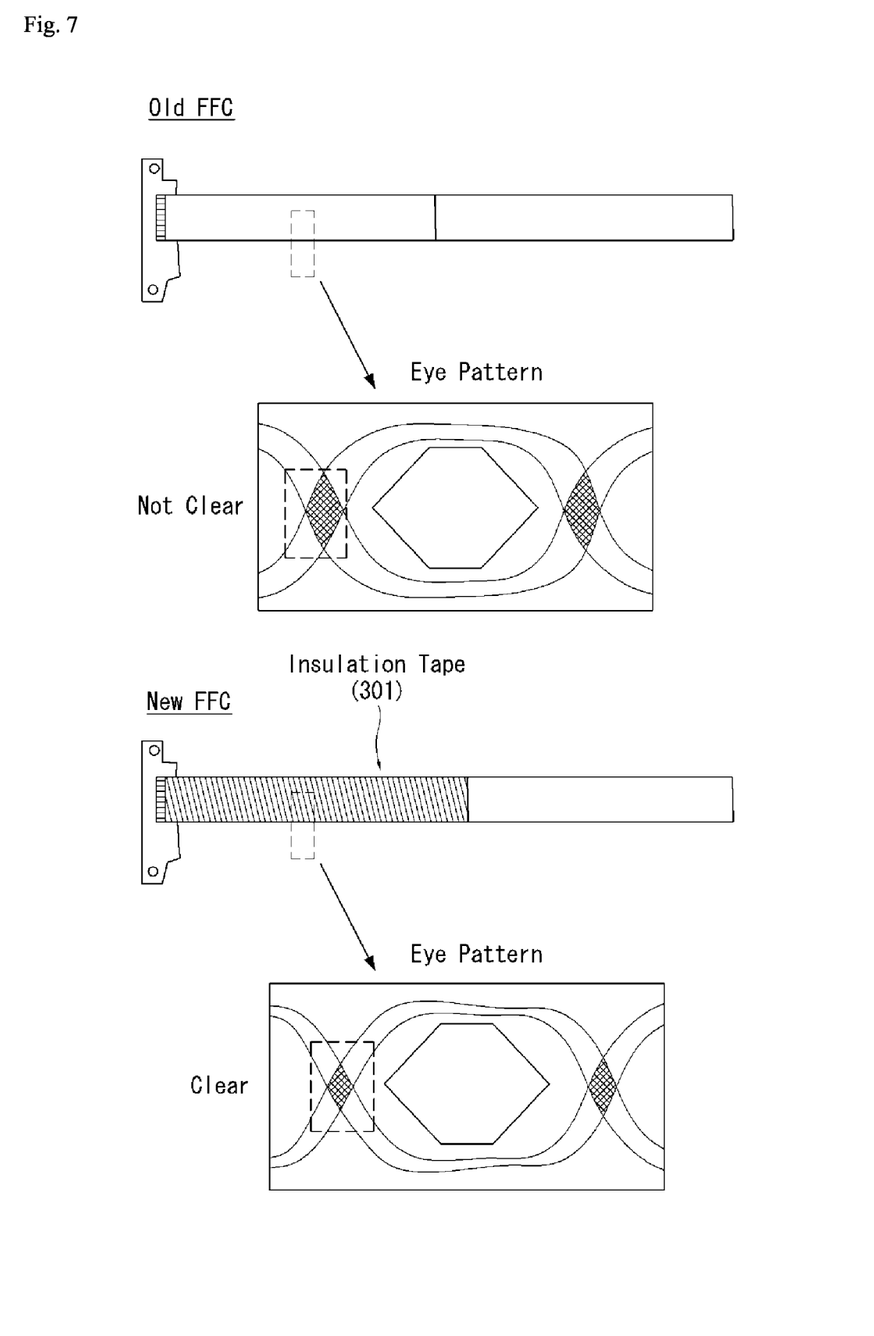
FIG. 7 illustrates an eye pattern measured when insulating tape is attached to the upper surface of a fixed part of a flexible flat cable according to one embodiment of the present invention.

As shown in FIG. 7, since insulating tape 302 is not attached to the upper surface of a fixed part of a conventional FFC, as the tray is closed, inter-symbol interference is developed at the area where the moving part and the fixed part of the conventional flexible flat cable overlap each other, thereby preventing a sharp display of an eye pattern which is observed when signals read out from an optical disc are displayed together with timing signals.

Meanwhile, since insulating tape 302 is attached to the upper surface of a fixed part of a flexible flat cable of the present invention, suppressed is inter-symbol interference developed at the area where the moving part and the fixed part of the flexible flat cable overlap each other as the tray is closed; therefore, the eye pattern can be observed clearly.

Figure 8:
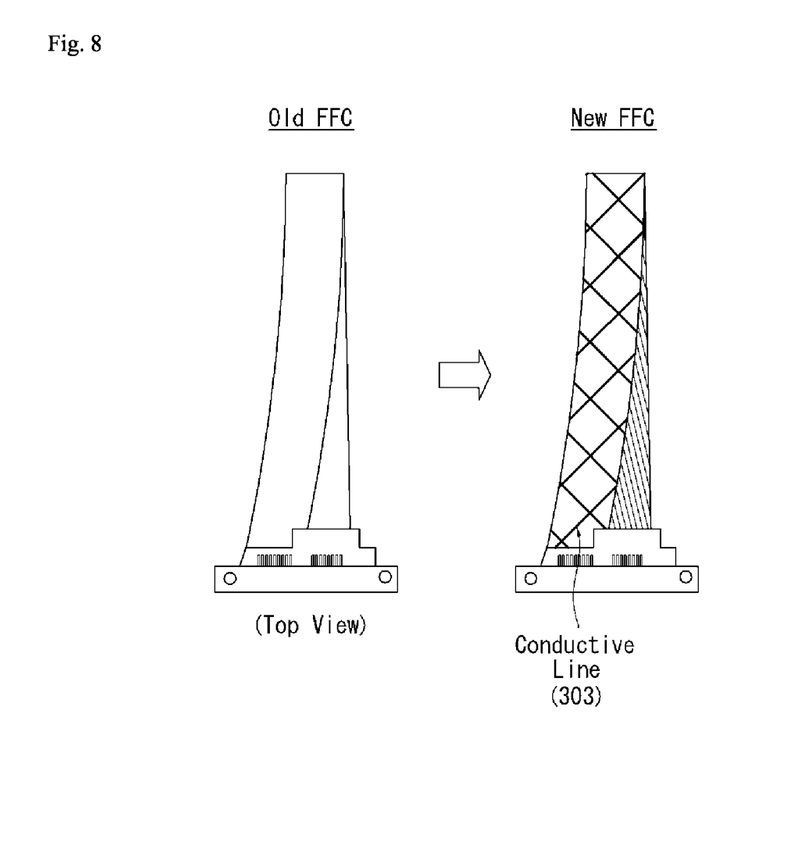
FIG. 8 illustrates a case where tape with mesh lines of conductive material is attached to the upper surface of a moving part of a flexible flat cable according to one embodiment of the present invention.

In addition, as shown in FIG. 8, in one embodiment of the present invention, by taking account of the fact that the upper surface of a moving part of a flexible flat cable 30 comes into contact with a printed circuit board 21 installed in the rear surface of the tray as the tray is closed, tape 303 with meshed lines of conductive material may be attached to the upper surface of the moving part.

Figure 9:
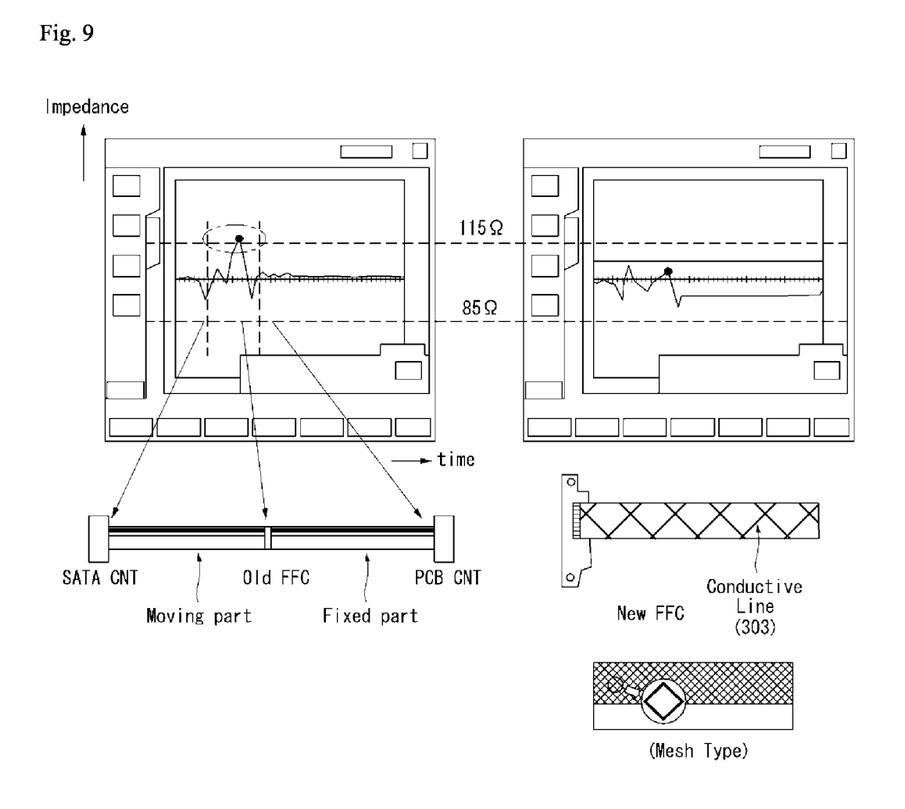
FIG. 9 illustrates impedance measurements when tape with mesh lines of conductive material is attached to the upper surface of a moving part of a flexible flat cable according to one embodiment of the present invention.

As shown in FIG. 9, since the upper surface of a moving part of a conventional FFC does not have meshed lines of conductive material, the impedance value may increase in an abnormal fashion (e.g., 130 ohm) when a tray is closed as the moving part of the flexible flat cable connected to an SATA connector moves along a direction toward a PCB connector and thus, the upper surface of the moving part makes contact with a printed circuit board 21 installed in the rear surface of the tray.

On the contrary, since the upper surface of a moving part of a flexible flat cable of the present invention has meshed lines of conductive material, abnormal increase of the impedance value is suppressed even if the upper surface of the moving part comes into contact with the printed circuit board 21 installed in the rear surface of the tray as the tray is closed.

As described above, since a flexible flat cable of the present invention satisfies the impedance value, for example, a value ranging from 85 to 115 ohm, required for SATA interface supporting fast data transfer, low cost flexible flat cables which can be mass-produced according to the corresponding standard specifications may be employed and at the same time, an error which may occur during fast data transfer through SATA interface due to impedance mismatching can be prevented.

Preferred embodiments of the present invention have been introduced for the illustration purpose only. Therefore, it should be noted that various improvements, modifications, substitutions of, or additions to the present invention are possible without departing from the technical principles and scope of the present invention.

What is claimed is:

1. An optical disc drive, comprising:
   a case forming an external shape of the optical disc drive;
   a tray for loading an optical disc by staying in the case or protruding from the front surface of the case; and
   a flexible flat cable for connecting a first connector installed at a rear of the case and a second connector of a printed circuit board installed at a rear surface of the tray,
   wherein insulating tape for impedance matching is attached to a bottom surface of a fixed part of the flexible flat cable, and
   wherein second insulating tape is additionally attached to a surface of the fixed part of the flexible flat cable overlapping a moving part of the flexible flat cable.

2. The optical disc drive of claim 1, wherein the first connector is an SATA connector.

3. The optical disc drive of claim 1, wherein third tape with meshed lines of conductive material is attached to a surface of the moving part of the flexible flat cable come into contact with the printed circuit board while the tray stays in the case.

4. An optical disc drive, comprising:
a case forming an external shape of the optical disc drive;
a tray for loading an optical disc by staying in the case or protruding from the front surface of the case; and
a flexible flat cable for connecting a first connector installed at a rear of the case and a second connector of a printed circuit board installed at a rear surface of the tray,
wherein insulating tape is attached to at least one of surfaces of a moving part and a fixed part of the flexible flat cable overlapping each other.

5. The optical disc drive of claim 4, wherein second tape with meshed lines of conductive material is attached to a surface of the moving part of the flexible flat cable come into contact with the printed circuit board while the tray stays in the case.

6. An optical disc drive, comprising:
a case forming an external shape of the optical disc drive;
a tray for loading an optical disc by staying in the case or protruding from the front surface of the case; and
a flexible flat cable for connecting a first connector installed at a rear of the case and a second connector of a printed circuit board installed at a rear surface of the tray,
wherein insulating tape for impedance matching is attached to a bottom surface of a fixed part of the flexible flat cable, and
wherein second tape is attached to a surface of a moving part of the flexible flat cable come into contact with the printed circuit board while the tray stays in the case.

7. The optical disc drive of claim 6, wherein meshed lines of conductive material are formed in the second tape.

* * * * *